(12) United States Patent
Wang

(10) Patent No.: US 9,512,865 B2
(45) Date of Patent: Dec. 6, 2016

(54) TELESCOPIC TUBE, WALKING STICK WITH THE TELESCOPIC TUBE, AND CLOTHES POLE WITH THE TELESCOPIC TUBE

(71) Applicant: YEAGLE DEVELOPMENT CO., LTD., New Taipei (TW)

(72) Inventor: Tsung-Hsiang Wang, New Taipei (TW)

(73) Assignee: YEAGLE DEVELOPMENT CO., LTD., New Taipei (TW)

( * ) Notice: Subject to any disclaimer, the term of this patent is extended or adjusted under 35 U.S.C. 154(b) by 0 days.

(21) Appl. No.: 14/829,937

(22) Filed: Aug. 19, 2015

(65) Prior Publication Data

US 2016/0053789 A1    Feb. 25, 2016

(30) Foreign Application Priority Data

Aug. 22, 2014 (CN) ..................... 2014 2 0477939 U

(51) Int. Cl.
| | |
|---|---|
| F16B 7/10 | (2006.01) |
| A45B 9/00 | (2006.01) |
| A47G 25/06 | (2006.01) |
| A61H 3/00 | (2006.01) |
| A61H 3/02 | (2006.01) |
| A45B 3/00 | (2006.01) |
| A45B 3/06 | (2006.01) |

(52) U.S. Cl.
CPC ................ *F16B 7/105* (2013.01); *A45B 3/00* (2013.01); *A45B 3/06* (2013.01); *A45B 9/00* (2013.01); *A47G 25/06* (2013.01); *A61H 3/00* (2013.01); *A61H 3/02* (2013.01); *F16B 7/10* (2013.01); *A45B 2009/007* (2013.01); *A61H 2201/0161* (2013.01)

(58) Field of Classification Search
CPC .... F16B 7/10; F16B 7/105; A61H 2201/0161; A45B 2009/007
USPC .......... 135/75; 403/108, 109.2, 109.3, 109.6, 403/109.7
See application file for complete search history.

(56) References Cited

U.S. PATENT DOCUMENTS

| | | | | |
|---|---|---|---|---|
| 2,229,475 | A * | 1/1941 | Redmer | F16B 7/105 248/188.5 |
| 2,427,841 | A * | 9/1947 | Morris | E04H 12/182 248/188.5 |
| 2,980,456 | A * | 4/1961 | McMullin | F16B 7/105 403/104 |
| 4,528,998 | A * | 7/1985 | Gamm | A45B 9/00 135/75 |

(Continued)

*Primary Examiner* — Noah Chandler Hawk
(74) *Attorney, Agent, or Firm* — patenttm.us

(57) ABSTRACT

A telescopic tube has a tube assembly and a connecting assembly. The tube assembly has a first rod, a second rod, a third rod, and a fourth rod. The second rod, the third rod, and the fourth rod are mounted respectively around outer surfaces of the first rod, of the second rod, and of the third rod respectively. The connecting assembly has a first connecting unit, a second connecting unit, and a third connecting unit. The first connecting unit links together the first rod and the second rod. The second connecting unit links together the second rod and the third rod. The third connecting unit links together the third rod and the fourth rod. The telescopic tube is applied on a walking stick or a clothes pole which ensures that the walking stick or the clothes pole has a small size when retracted and ease of use when extended.

18 Claims, 16 Drawing Sheets

(56) References Cited

U.S. PATENT DOCUMENTS

| | | | | |
|---|---|---|---|---|
| 5,149,092 A * | 9/1992 | Parsons | ............. | F41B 15/027 |
| | | | | 135/40 |
| 6,079,894 A * | 6/2000 | Obitts | ............. | A61H 3/02 |
| | | | | 135/75 |
| 6,085,766 A * | 7/2000 | Geary | ............. | A01B 1/00 |
| | | | | 135/68 |
| 6,238,292 B1 * | 5/2001 | Pelkey | ............. | F41B 15/027 |
| | | | | 403/368 |
| 6,854,916 B2 * | 2/2005 | Hsieh | ............. | F16B 7/105 |
| | | | | 403/109.1 |
| 7,219,386 B2 * | 5/2007 | Tsuchiya | ............. | A47L 13/20 |
| | | | | 15/144.4 |
| 2012/0205510 A1 * | 8/2012 | Fortier | ............. | A45C 13/262 |
| | | | | 248/423 |

* cited by examiner

TELESCOPIC TUBE, WALKING STICK WITH THE TELESCOPIC TUBE, AND CLOTHES POLE WITH THE TELESCOPIC TUBE

BACKGROUND OF THE INVENTION

1. Field of the Invention

The present invention relates to a tube and more particularly to a telescopic tube that is applied to a walking stick or a clothes pole.

2. Description of the Related Art

With reference to FIG. 15, a conventional walking stick has a tube assembly 60 and a cord 70. The tube assembly 60 has a first rod 61, a second rod 62, a third rod 63, and a fourth rod 64. The first rod 61 has a grounding cover 611 that is mounted on the first rod 61. The fourth rod 64 has a handgrip 641 that is mounted on the fourth rod 64. The cord 70 is flexible and links together the first rod 61, the second rod 62, the third rod 63, and the fourth rod 64.

When in use, the walking stick is extended. The cord 70 is stretched, and the first rod 61, the second rod 62 and third rod 63 are mounted respectively through the second rod 62, the third rod 63 and the fourth rod 64. When the user wants to store the walking stick, the walking stick is folded. The cord 70 is stretched again, and the first rod 61, the second rod 62 and third rod 63 depart respectively from the second rod 62, the third rod 63 and the fourth rod 64.

However, when the tube assembly 60 is folded, the folded walking stick is too oversized to be received into a bag.

With reference to FIG. 16, another conventional walking stick has a tube assembly 80 and a bushing 90. The tube assembly 80 has a first rod 81 and a second rod 82. The first rod 81 has a first protruding part 811 that has an external thread. The second rod 82 has a second protruding part 821 that has an external thread. The bushing 90 has a first mounting recess 91 and a second mounting recess 92. The first mounting recess 91 is defined in one of two end surfaces of the bushing 90, and has an internal thread. The second mounting recess 92 is defined in the other end surface of the bushing 90, and has an internal thread.

When the walking stick is in use, the first protruding part 811 and the second protruding part 821 are mounted respectively in the first mounting recess 91 and the second mounting recess 92 by threading together. When the walking stick is folded, the bushing 90 is detached from the first rod 81 and the second rod 82.

However, as the first rod 81 is connected to the second rod 82 with the bushing 90 by threading together, a usage of the walking stick is too complicated.

SUMMARY OF THE INVENTION

An objective of the present invention is to provide a telescopic tube which can be applied on a walking stick or a clothes pole to have a small size in retraction and ease of use in extension.

To achieve the foregoing objective, the telescopic tube in accordance with the present invention comprises a tube assembly and a connecting assembly. The tube assembly has a first rod, a second rod, a third rod, and a fourth rod. The second rod, the third rod, and the fourth rod are mounted around outer surfaces of the first rod, of the second rod, and of the third rod respectively. The connecting assembly has a first connecting unit, a second connecting unit, and a third connecting unit. The first connecting unit links together the first rod and the second rod. The second connecting unit links together the second rod and the third rod. The third connecting unit links together the third rod and the fourth rod.

Other objectives, advantages and novel features of the invention will become more apparent from the following detailed description when taken in conjunction with the accompanying drawings.

DETAILED DESCRIPTION OF THE INVENTION

Figure 1:
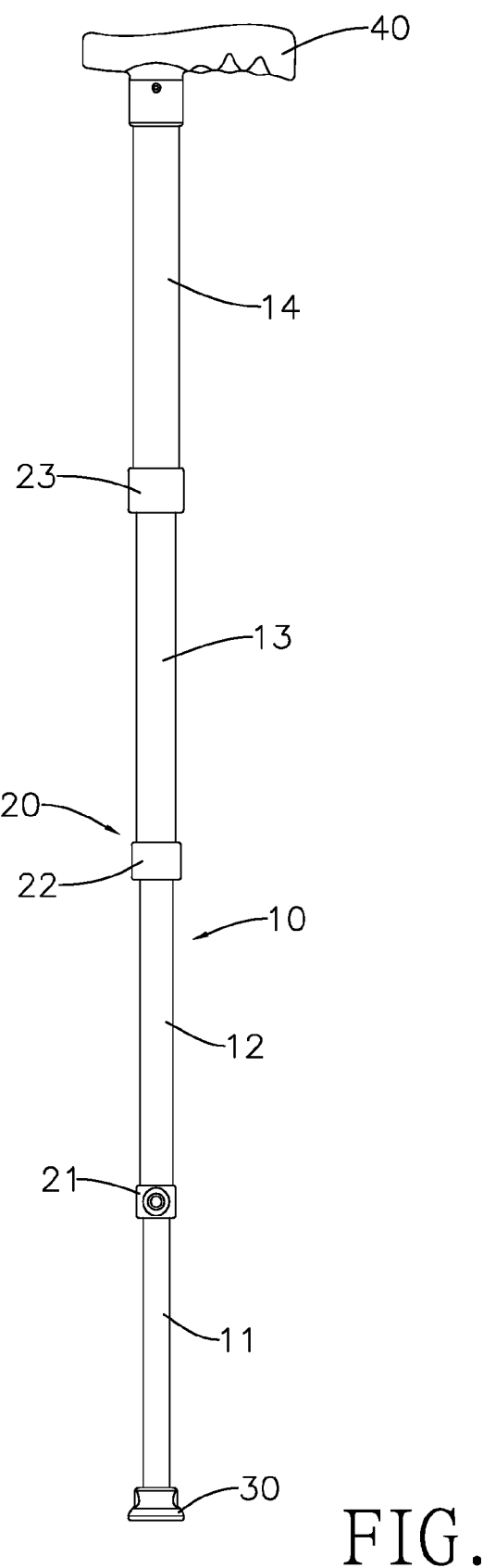
FIG. 1 is a front view of a first embodiment of a telescopic tube in accordance with the present invention, shown applied on a walking stick.

With reference to FIG. 1, a telescopic tube in accordance with the present application has a tube assembly 10 and a connecting assembly 20.

Figure 3:
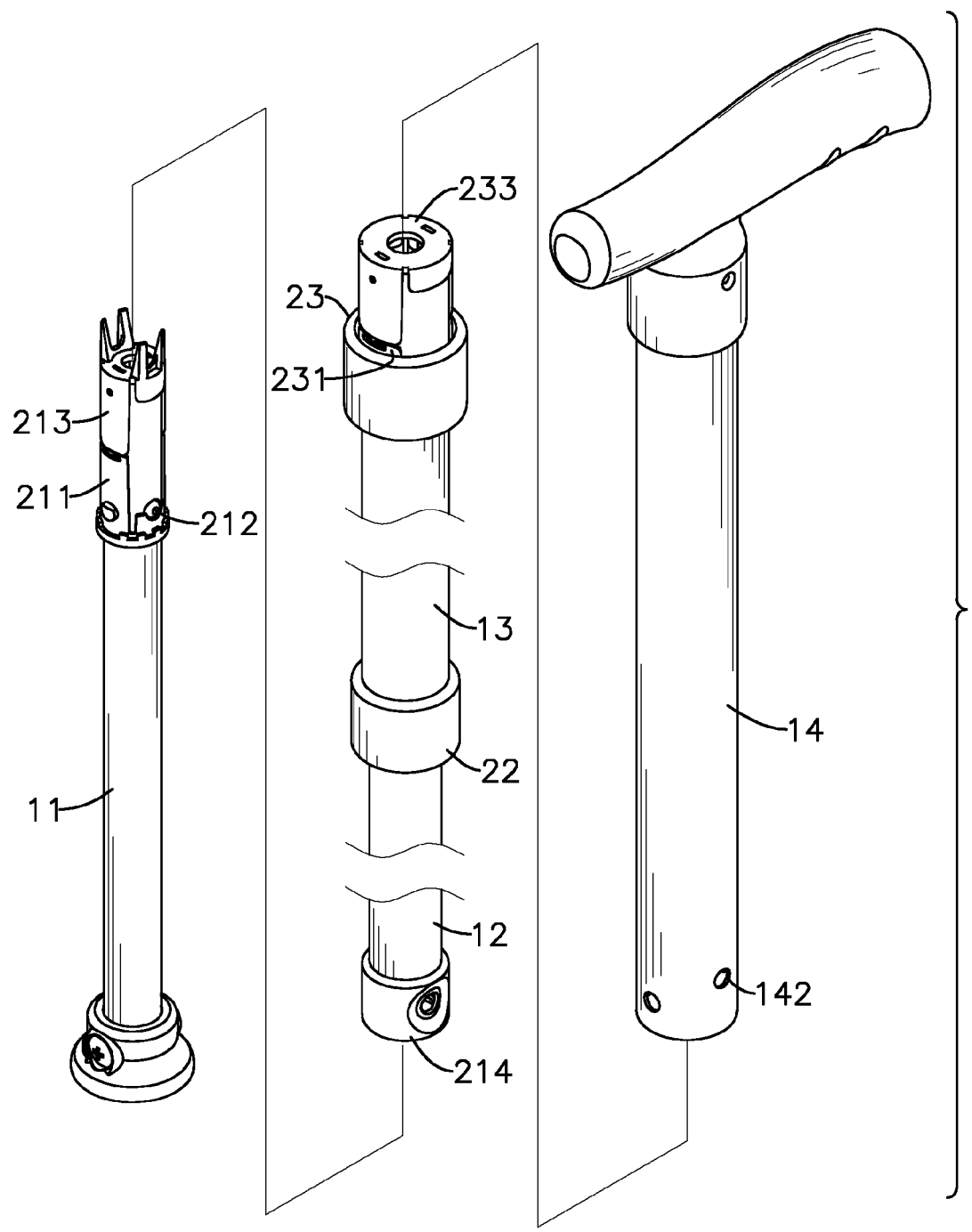
FIG. 3 is an exploded perspective view of a tube assembly in FIG. 1.
Figure 9:
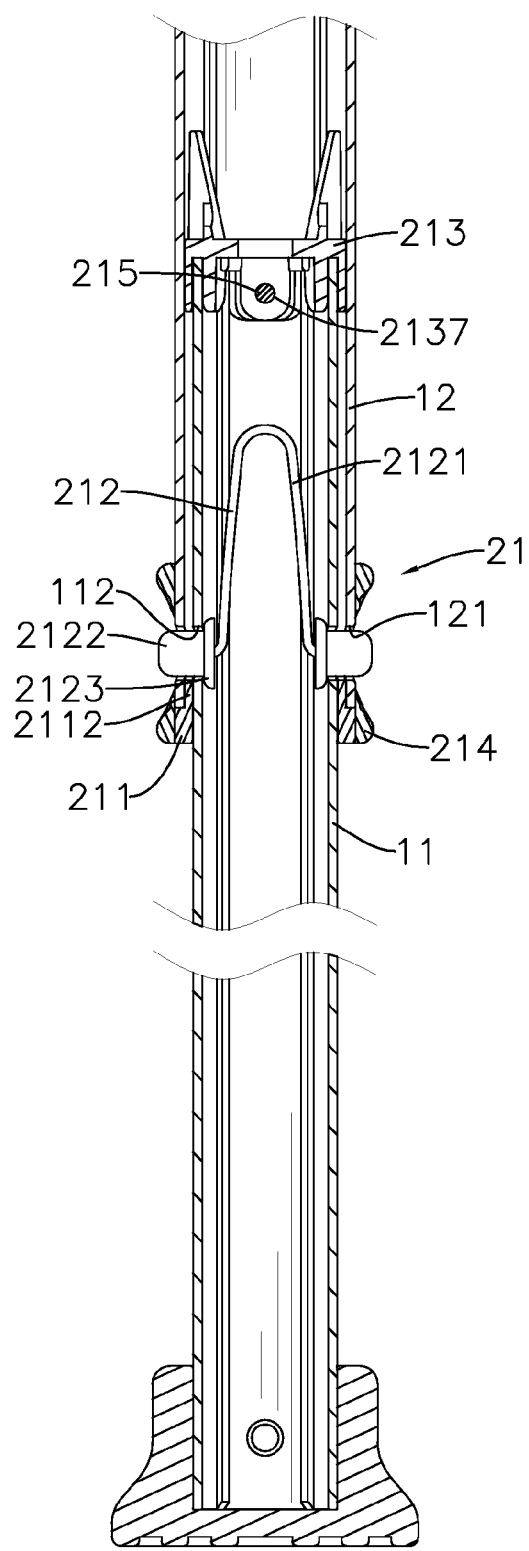
FIG. 9 is a cross sectional side view of a first rod, a second rod and a first connecting unit in FIG. 1, showing that the telescopic tube of the first embodiment is extended.
Figure 10:
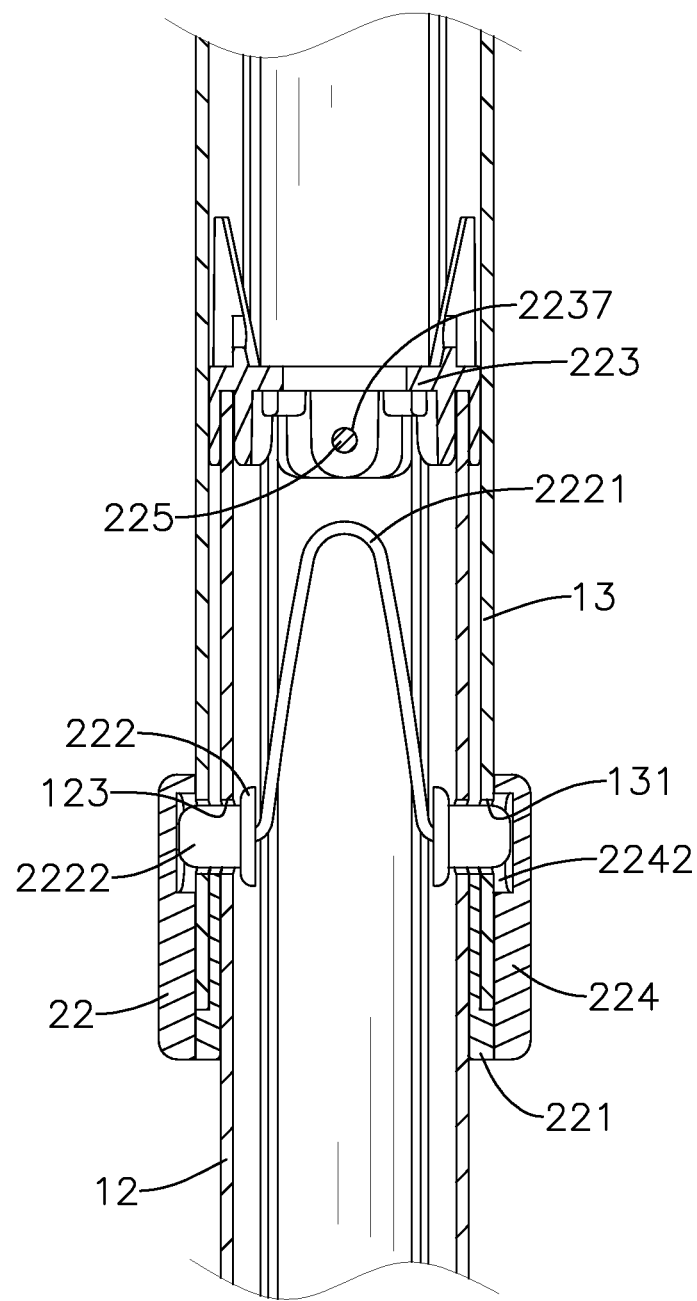
FIG. 10 is another cross sectional side view of the second rod, a third rod and a second connecting unit in FIG. 1, showing that the telescopic tube of the first embodiment is extended.

With reference to FIGS. 3, 9 and 10, the tube assembly 10 has a first rod 11, a second rod 12, a third rod 13, and a fourth rod 14.

The first rod 11 has two first fixing holes 111, two first positioning holes 112, and two connecting holes 113.

The first fixing holes 111 are defined in one of two ends of the first rod 11.

The first positioning holes 112 are defined in the first rod 11. The first positioning holes 112 are located adjacent to the first fixing holes 111.

Figure 2:
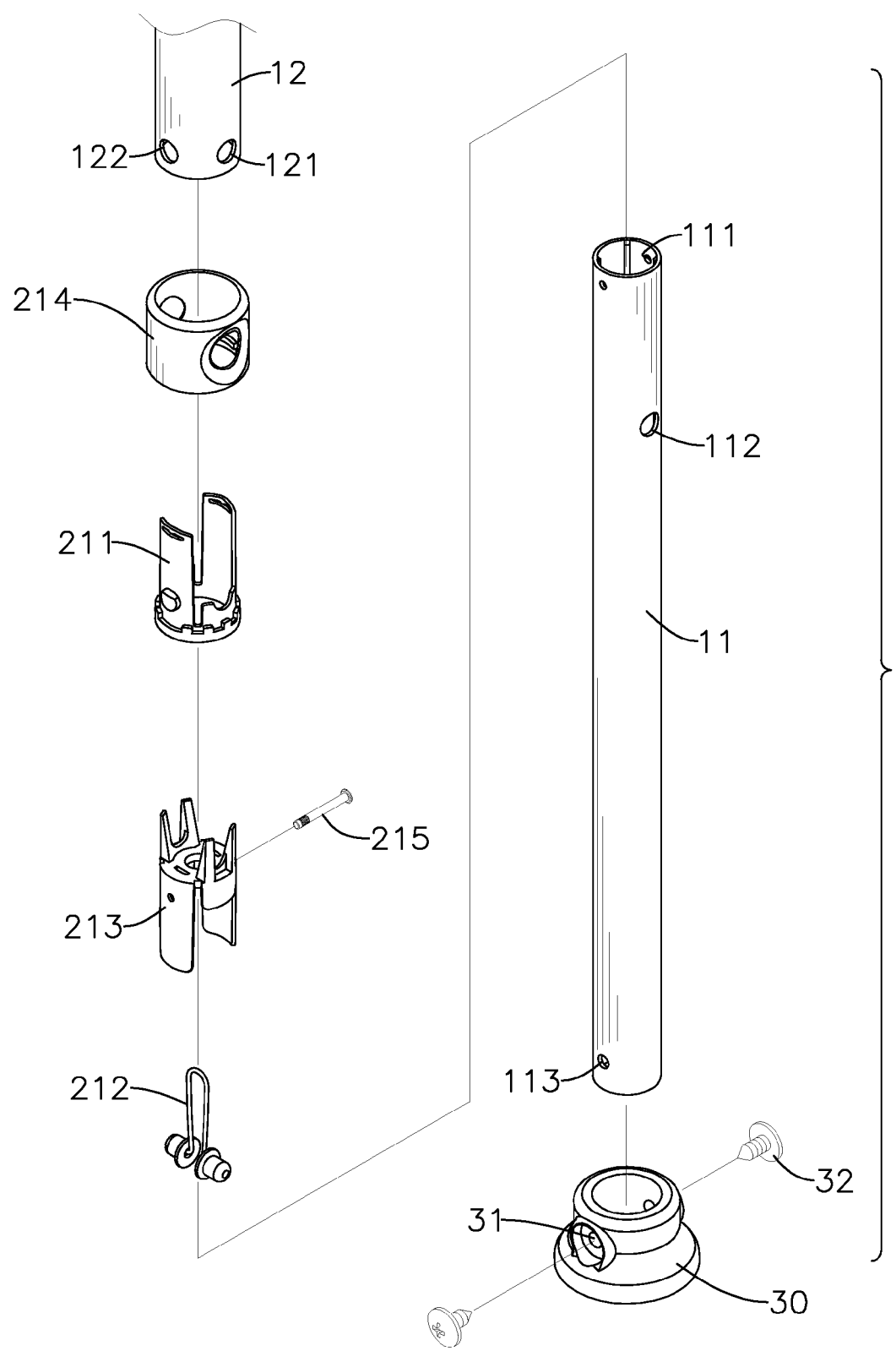
FIG. 2 is an exploded perspective view of a first rod, a first connecting unit and a cap in FIG. 1.

The connecting holes 113 are defined in the other end of the first rod 11, as shown in FIG. 2.

The second rod 12 is mounted around an outer surface of the first rod 11, and has two second positioning holes 121, two first abutting holes 122, and two third positioning holes 123. An inner diameter of the second rod 12 is larger than an outer diameter of the first rod 11.

The second positioning holes 121 are defined in one of two ends of the second rod 12, and correspond to the first positioning holes 112.

The first abutting holes 122 are defined in the second rod 12, and are located adjacent to the second positioning holes 121.

The two third positioning holes 123 are defined in the other end of the second rod 12.

Figure 11:
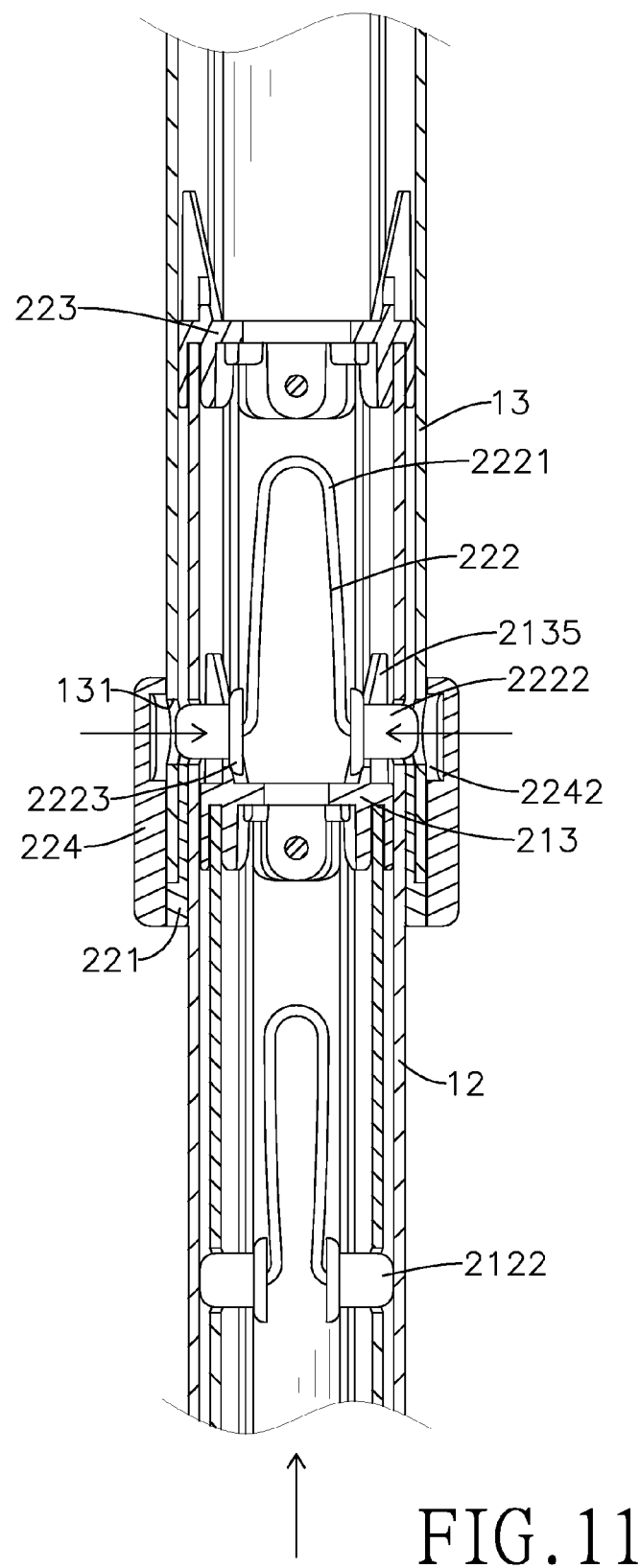
FIG. 11 is a cross sectional side view of the second rod, the third rod and the second connecting unit in FIG. 10, showing that the telescopic tube of the first embodiment is retracted.
Figure 13:
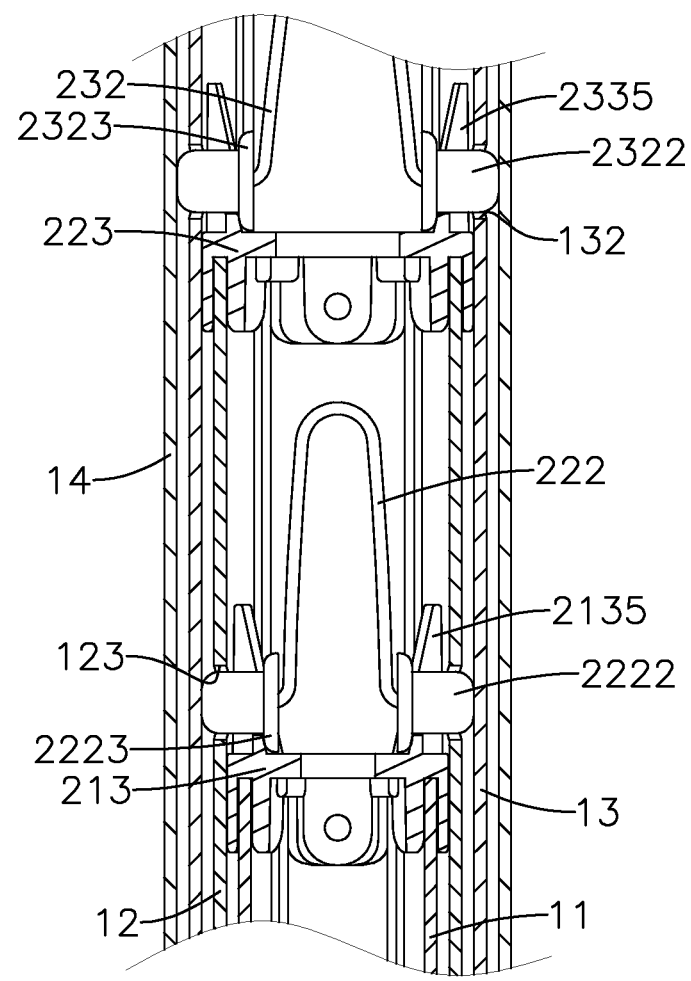
FIG. 13 is an enlarged cross sectional side view of the tube assembly, showing that the telescopic tube of the first embodiment is retracted.

With reference to FIGS. 11 and 13, the third rod 13 is mounted around an outer surface of the second rod 12, and has two fourth positioning holes 131 and two fifth positioning holes 132. An inner diameter of the third rod 13 is larger than an outer diameter of the second rod 12.

The fourth positioning holes 131 are defined in one of two ends of the third rod 13.

The fifth positioning holes 132 are defined in the other end of the third rod 13.

The fourth rod 14 is mounted around an outer surface of the third rod 13. An inner diameter of the fourth rod 14 is larger than an outer diameter of the third rod 13.

With reference to FIGS. 1 and 2, the connecting assembly 20 has a first connecting unit 21, a second connecting unit 22, and a third connecting unit 23.

As shown in FIGS. 2 and 3, the first connecting unit 21 links together the first rod 11 and the second rod 12, and has a first abutting ring 211, a first positioning element 212, a first abutting cover 213, a first covering ring 214, and a first fixing element 215.

Figure 4:
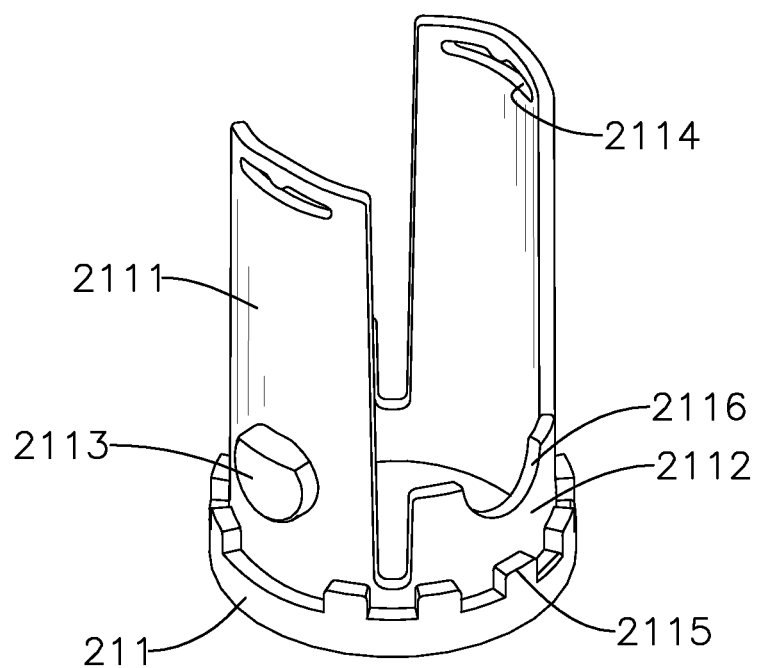
FIG. 4 is a perspective view of a first abutting ring in FIG. 3.

With reference FIGS. 2 to 4, the first abutting ring 211 is mounted inside the second rod 12, is mounted around the outer surface of the first rod 11, and has two abutting slices 2111, two encircling slices 2112, two columns 2113, two slots 2114, multiple protruding parts 2115, and two notches 2116.

The abutting slices 2111 protrude axially from the first abutting ring 211.

The encircling slices 2112 protrude axially from the first abutting ring 211, and are located adjacent to the abutting slices 2111.

The columns 2113 are mounted through the first abutting holes 122, and protrude radially from outer surfaces of the abutting slices 2111 respectively.

The slots 2114 are defined in the abutting slices 2111 respectively.

The protruding parts 2115 protrude axially from the first abutting ring 211, and are spaced apart at intervals.

The notches 2116 are defined in the encircling slices 2112 respectively, and correspond to the first positioning holes 112.

Figure 5:
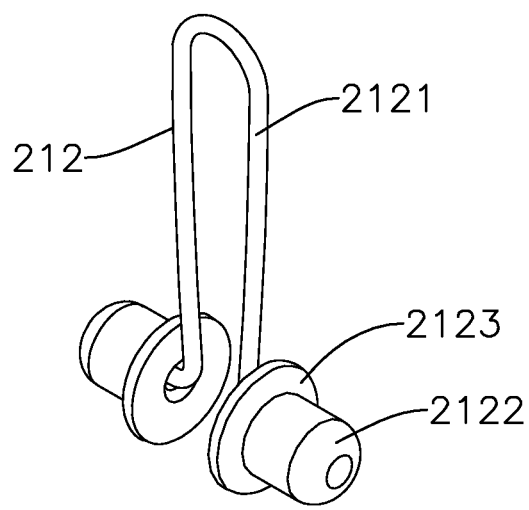
FIG. 5 is a perspective view of a first positioning element in FIG. 2.
Figure 6:
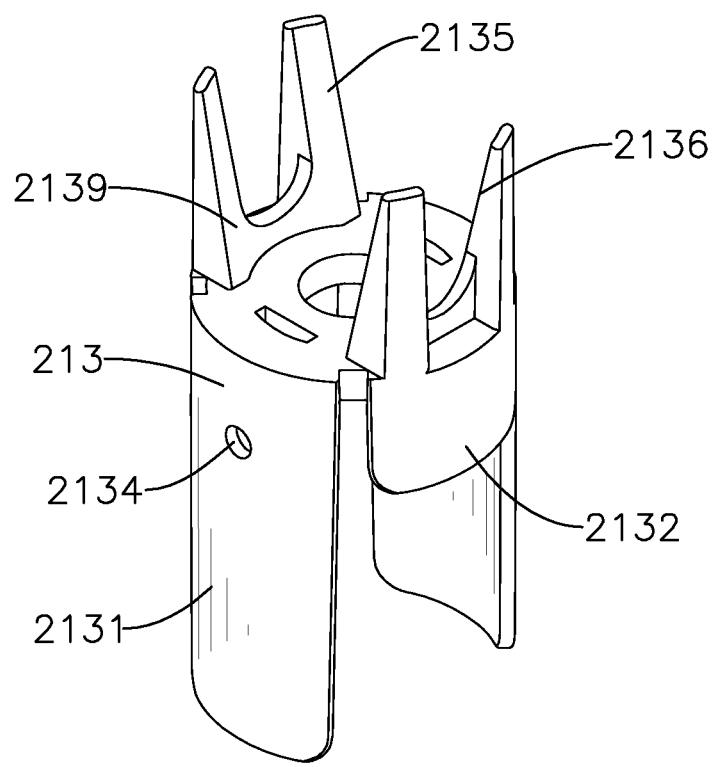
FIG. 6 is a perspective view of a first abutting cover in FIG. 2.
Figure 7:
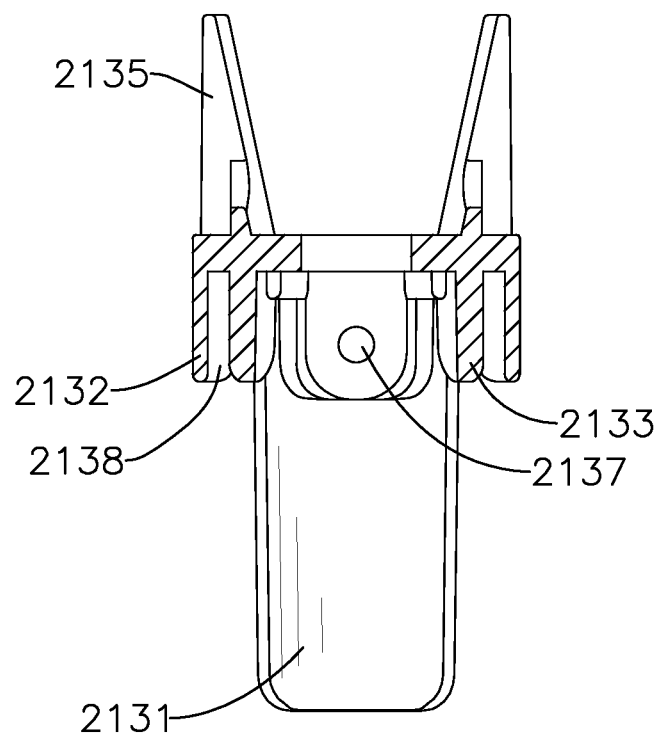
FIG. 7 is a cross sectional side view of the first abutting cover in FIG. 6.

With reference to FIGS. 3, 5 and 9, the first positioning element 212 has a coupling strip 2121, two engaging stubs 2122, and two abutting flanges 2123.

The coupling strip 2121 is mounted inside the first rod 11 and is flexible.

The engaging stubs 2122 are formed at both ends of the coupling strip 2121, are mounted respectively through the first positioning holes 112 and the second positioning holes 121, and are mounted in the notches 2116.

The abutting flanges 2123 are formed radially on two outer surfaces of the two engaging stubs 2122 respectively, and abut an inner surface of the first rod 11.

As shown in FIGS. 2, 3, 6 and 7, the first abutting cover 213 is mounted on the first rod 11, and has two first extending slices 2131, two second extending slices 2132, four inner extending slices 2133, two first through holes 2134, two operating parts 2135, two recesses 2136, two second through holes 2137, and an annular groove 2138.

The first extending slices 2131 protrude axially from one of two end surfaces of the first abutting cover 213, and abut the outer surface of the first rod 11.

The second extending slices 2132 protrude axially from the first abutting cover 213, are located adjacent to the first extending slices 2131, and abut the outer surface of the first rod 11.

The inner extending slices 2133 protrude axially from the first abutting cover 213, correspond to the second extending slices, and abut an inner surface of the first rod 11.

The first through holes 2134 are defined in the first extending slices 2131 respectively, and correspond to the first fixing holes 111.

The operating parts 2135 protrude axially from the other end surface of the first abutting cover 213 and each operating part 2135 has an inclined surface 2139 formed on the operating part 2135. The inclined surfaces 2139 are located opposite to each other.

The recesses 2136 are defined in the operating parts 2135 respectively.

The second through holes 2137 are defined in the two inner extending slices 2133 respectively, and correspond to the first through holes 2134 and the first fixing holes 111.

The annular groove 2138 is defined in the first abutting cover 213, is disposed between the first extending slices 2131 and the second extending slices 2132, and is disposed on the first rod 11.

Figure 8:
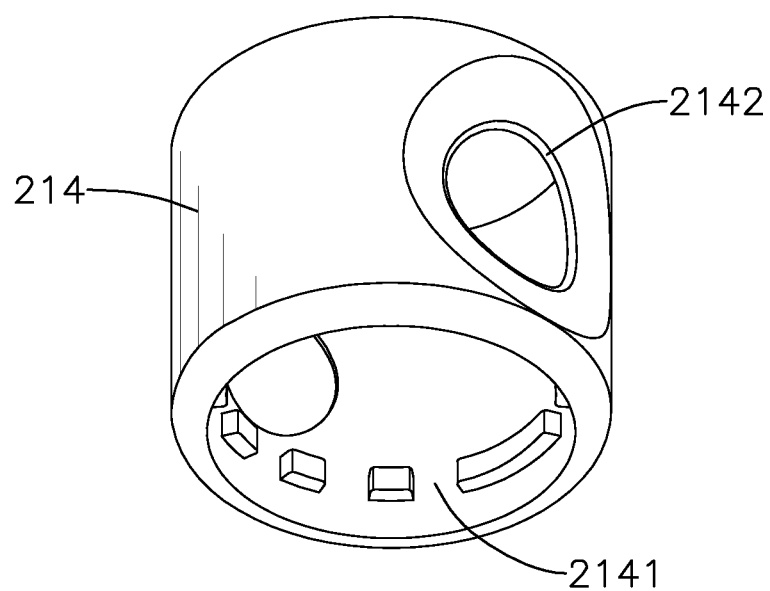
FIG. 8 is another perspective view of a first covering ring in FIG. 2.

As shown in FIGS. 3, 8 and 9, the first covering ring 214 is mounted around the outer surface of the second rod 12 and has multiple mounting recesses 2141 and two insertion holes 2142.

The mounting recesses 2141 are defined in an inner surface of the first covering ring 214, are spaced apart at intervals, and are disposed in the protruding parts 2115.

The insertion holes 2142 are defined in an annual wall of the first covering ring 214, correspond to the first positioning holes 112 and the second positioning holes 121, and receive the engaging stubs 2122.

As shown in FIGS. 3, 6, 7 and 9, the first fixing element 215 is mounted through the first fixing holes 111, the first through holes 2134, and the second through holes 2137.

As shown in FIGS. 2 and 10, the second connecting unit 22 links together the second rod 12 and the third rod 13, and has a second abutting ring 221, a second positioning element 222, a second abutting cover 223, a second covering ring 224, and a second fixing element 225.

A difference between the second connecting unit 22 and the first connecting unit 21 is that the second covering ring 224 has two chambers 2242. The chambers 2242 are defined in an inner surface of the second covering ring 224, and receive the second positioning element 222. Other technical features and connecting relations of the second connecting unit 22 and the first connecting unit 21 are similar, and details thereof are omitted.

As shown in FIGS. 2 and 10, the third connecting unit 23 links together the third rod 13 and the fourth rod 14.

Technical features and connecting relations of the third connecting unit 23 and the first connecting unit 21 are similar, and details thereof are omitted. A difference between the third connecting unit 23 and the first connecting unit 21 is that a third abutting cover 233 of the third connecting unit 23 does not have two operating parts and two recesses.

As shown in FIGS. 1 to 3, a first embodiment of the present invention is applied to a walking stick. The walking stick has a cap 30 and a handgrip 40. The cap 30 and the handgrip 40 are mounted on two ends of the tube assembly 10.

Specifically, the cap 30 has two fastening holes 31 and two fastening elements 32. The cap 30 is mounted on the first rod 11. The fastening holes 31 are defined in the cap 30 and correspond to the connecting holes 113. The fastening elements 32 are mounted through the fastening holes 31 and the connecting holes 113. The handgrip 40 is mounted on the fourth rod 14.

Figure 14:
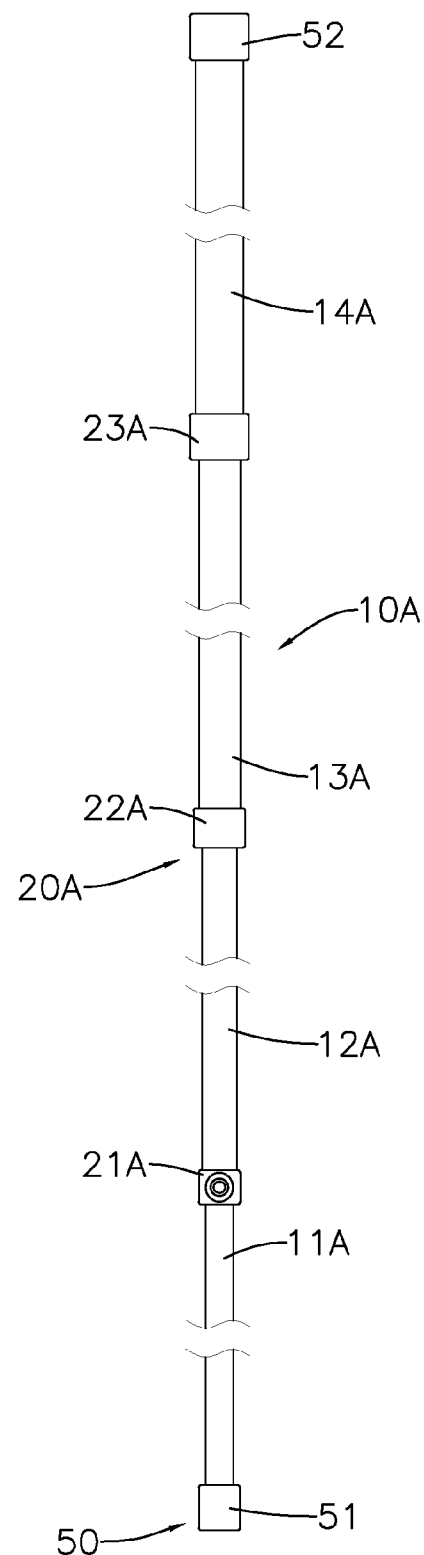
FIG. 14 is a front view of a second embodiment of a tube assembly in accordance with the present invention, shown applied on a clothes pole.
Figure 15:
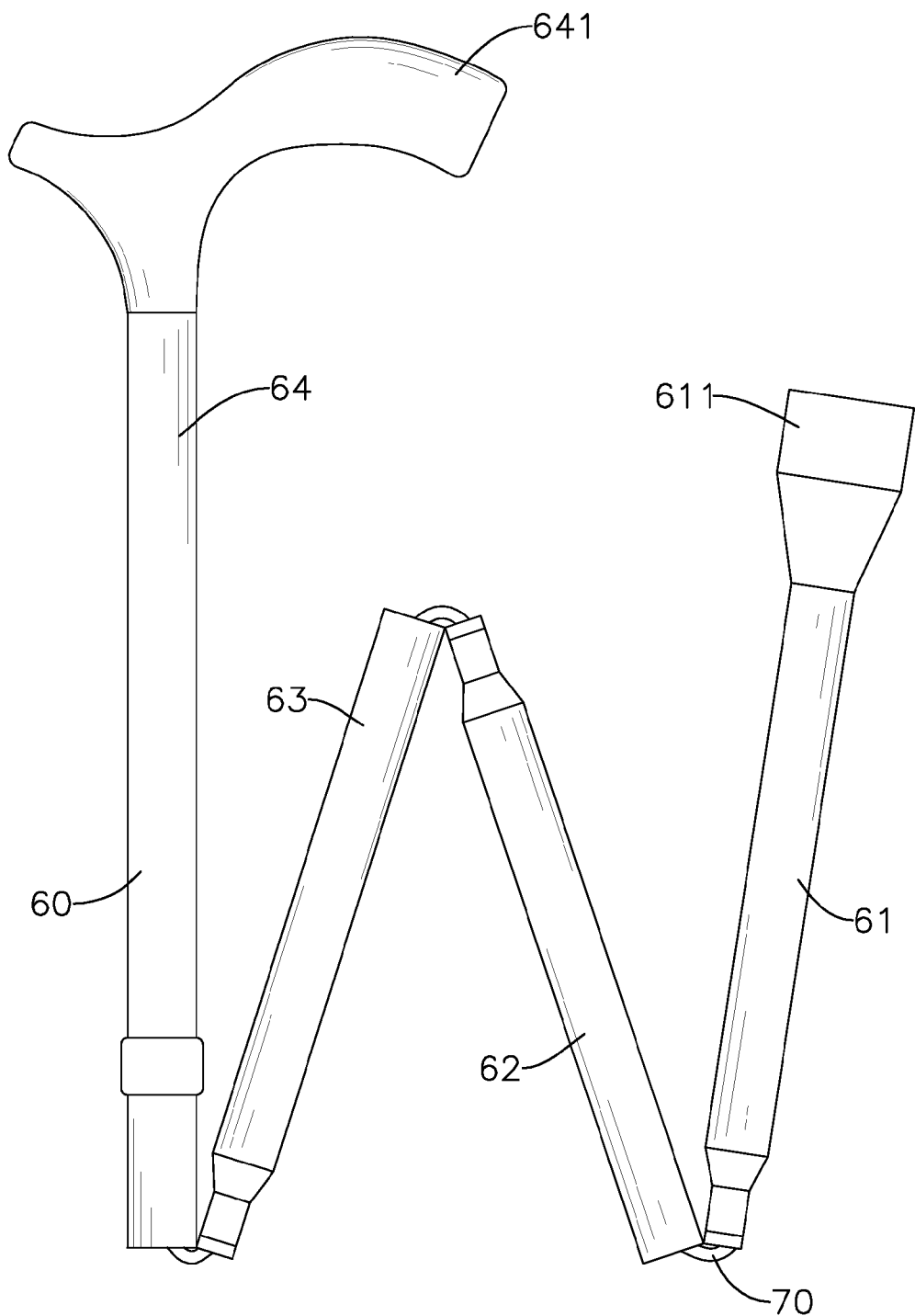
FIG. 15 is a front view of a walking stick in accordance with the prior art, showing that the conventional walking stick is folded.
Figure 16:
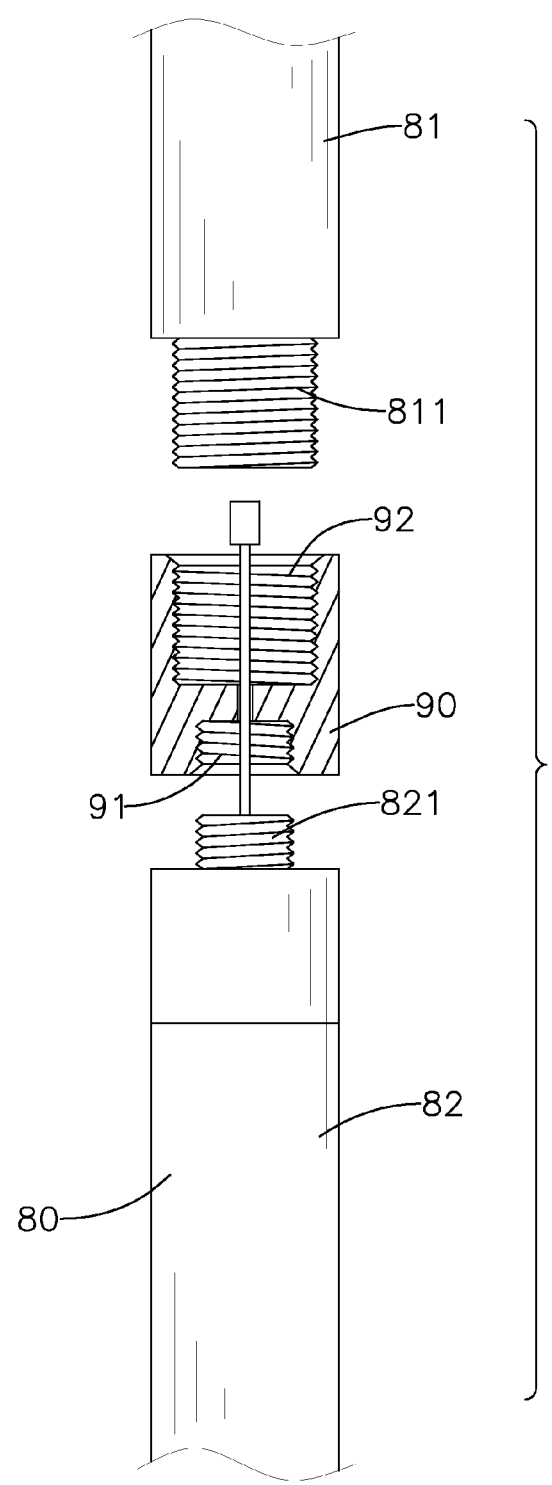
FIG. 16 is an enlarged exploded side view in partial section of another walking stick in accordance with the prior art.

With reference to FIG. 14, a second embodiment of the present invention is applied to a clothes pole. The clothes pole has a covering assembly 50

The covering assembly 50 has a first end cover 51 and a second end cover 52.

The first end cover 51 and the second end cover 52 are mounted respectively on two ends of the tube assembly 10A. Specifically, the first end cover 51 is mounted on the first rod 11A and the second end cover 52 is mounted on the second rod 12A.

As shown in FIGS. 2, 4 and 9, when the telescopic tube is extended, the abutting slices 2111 of the first abutting ring 211 abut the first extending slices 2131 of the first abutting cover 213. Thus, an end of the abutting slice 2111 in which the slot 2114 is defined has an elastic deformation. When the engaging stubs 2122 are mounted through the first positioning holes 112 and the second positioning holes 121, the abutting slice 2111 restores an original shape. The column 2113 drives the second rod 12 to move relative to the first rod 11. Therefore, the first positioning holes 112 and the second positioning holes 121 abut the engaging stub 2122. Then, a clearance between the first rod 11 and the second rod 12 is removed.

As shown in FIG. 10, the third rod 13 is slidably mounted on the second rod 12. The second abutting ring 221 and the second abutting cover 223 are mounted on the second rod 12. The second positioning element 222 is mounted inside the second rod 12. The second fixing element 225 is mounted through the second through holes 2237 of the second abutting cover 223. The second covering ring 224 is mounted on the third rod 13, and is connected to the second abutting ring 221. The chambers 2242 correspond to the third positioning holes 123 and the fourth positioning holes 131. The engaging stubs 2222 of the second positioning element 222 are mounted through the third positioning holes 123, the fourth positioning holes 131, and the chambers 2242 to position the telescopic tube.

As shown in FIGS. 6, 9, 11, and 12, when a user presses the engaging stubs 2122 to retract the walking stick, the coupling strip 2121 is bent. The engaging stubs 2122 are retracted inside the first rod 11, and the first rod 11 and the second rod 12 are disassembled from each other. Meanwhile, the user retracts the first rod 11 into the second rod 12. The recesses 2136 of the first abutting cover 213 abut the engaging stubs 2222 of the second positioning element 222, and the inclined surfaces 2139 abut the abutting flange 2223 of the second positioning element 222. Thus the second rod 12 and the third rod 13 are disassembled from each other.

Figure 12:
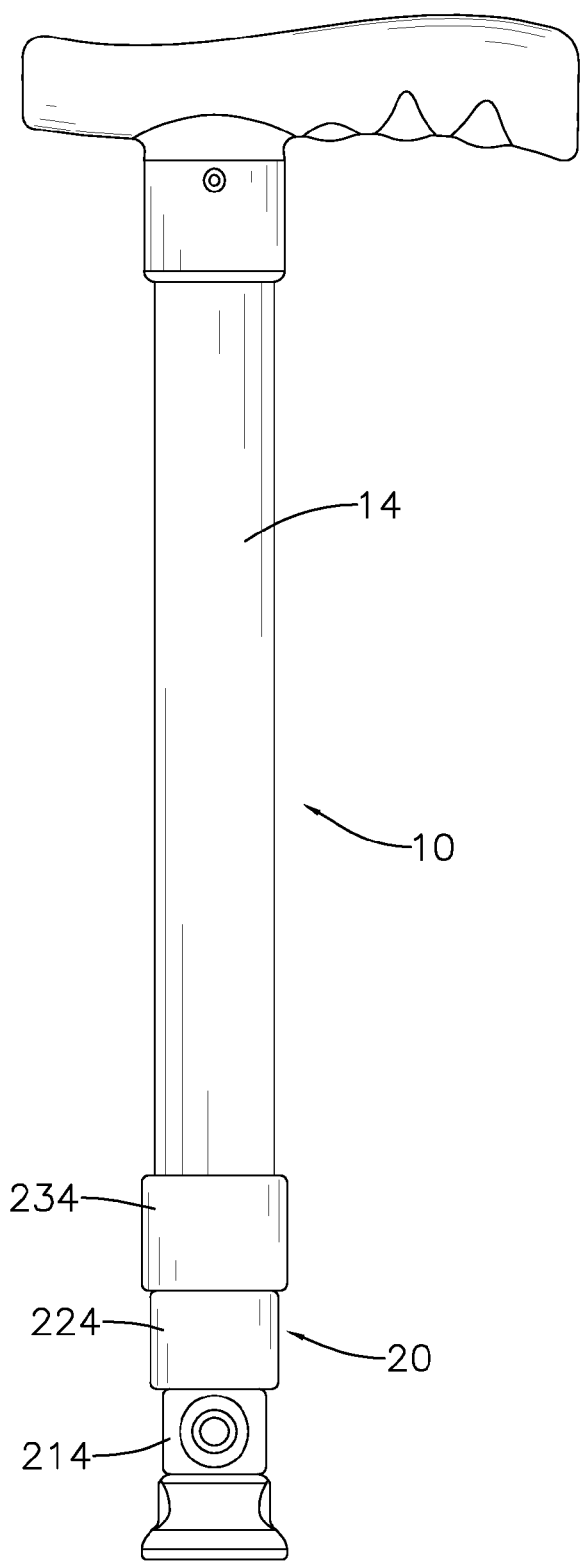
FIG. 12 is a side view of a fourth rod and a connecting assembly, showing that the telescopic tube of the first embodiment is retracted.

When the telescopic tube is retracted, as shown in FIGS. 11 to 13, the first rod 11, the second rod 12 and the third rod 13 are mounted respectively inside the second rod 12, the third rod 13 and the fourth rod 14. The operating parts 2135 abut the abutting flange 2223. The engaging stubs 2222 of the second positioning element 222 are mounted through the third positioning holes 123, and abut an inner surface of the third rod 13. The operating parts 2235 of the second abutting cover 223 abut an abutting flange 2323 of a third positioning element 232. The engaging stubs 2322 of the third positioning element 232 are mounted through the fifth positioning holes 132 of the third rod 13, and abut an inner surface of the fourth rod 14. The abutting rings and the covering rings of the connecting assembly 20 are disposed on one end of the tube assembly 10, and the positioning elements and the abutting covers of the connecting assembly 20 are disposed on the other end of the tube assembly 10.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A telescopic tube comprising:
   a tube assembly having
      a first rod having two first positioning holes defined in one of two ends of the first rod; and
      a second rod mounted around an outer surface of the first rod and having
         two second positioning holes defined in one of two ends of the second rod, wherein the second positioning holes correspond to the first positioning holes; and
   a connecting assembly having
      a first connecting unit linking together the first rod and the second rod, and having
         a first abutting ring mounted inside the second rod, and mounted around the outer surface of the first rod;
         a first positioning element having
            a coupling strip mounted inside the first rod and being bent and flexible;
            two engaging stubs formed at both ends of the coupling strip; and
            two abutting flanges formed radially on two outer surfaces of the two engaging stubs respectively, and abutting an inner surface of the first rod;
         a first abutting cover having
            two operating parts protruding axially from one of two end surfaces of the first abutting cover, and each operating part having an inclined surface formed on the operating part, wherein the other end surface of the first abutting cover is mounted on the first rod; and
            two recesses defined in the two operating parts respectively; and
         a first covering ring mounted around an outer surface of the second rod and having
            two insertion holes defined in an annual wall of the first covering ring, wherein the insertion holes correspond to the first positioning holes of the first rod and the second positioning holes of the second rod, and the engaging stubs mounted through the first positioning holes, the second positioning holes, and the insertion holes.

2. The telescopic tube as claimed in claim 1, wherein
the first rod has two first fixing holes defined in the first rod and located adjacent to the first positioning holes;
the first abutting cover has
two first extending slices protruding axially from the other end surface of the first abutting cover, abutting the outer surface of the first rod, and having two first through holes defined in the first extending slices respectively and corresponding to the first fixing holes;
two second extending slices protruding axially from the other end surface of the first abutting cover, located adjacent to the first extending slices, and abutting the outer surface of the first rod;
four inner extending slices protruding axially from the other end surface of the first abutting cover, abutting the inner surface of the first rod, and having two second through holes defined in the two inner extending slices respectively, and corresponding to the first through holes and the first fixing holes; and
an annular groove defined in the first abutting cover, located between the first extending slices and the second extending slices, and disposed on the first rod; and
the first connecting unit further has a first fixing element mounted through the first fixing holes, the first through holes, and the second through holes.

3. The telescopic tube as claimed in claim 2, wherein
the second rod has two first abutting holes defined in the second rod and located adjacent to the second positioning holes;
the first abutting ring has
two abutting slices protruding axially from the first abutting ring; and
two encircling slices protruding axially from the first abutting ring, and located adjacent to the abutting slices;
two columns mounted through the first abutting holes and protruding radially from outer surfaces of the abutting slices respectively;
two slots defined in the abutting slices respectively;
multiple protruding parts protruding axially from the first abutting ring, and spaced apart at intervals; and
two notches defined in the encircling slices respectively, corresponding to the first positioning holes of the first rod, and receiving the engaging stubs of the first positioning element; and
the first covering ring has multiple mounting recesses defined in an inner surface of the first covering ring, spaced apart at intervals, and mounted on the protruding parts of the first abutting ring.

4. The telescopic tube as claimed in claim 3, wherein
the tube assembly further has
a third rod mounted around the outer surface of the second rod, and having
two fourth positioning holes defined in one of two ends of the third rod, wherein the second rod has two third positioning holes defined in the other end of the second rod; and
the connecting assembly further has
a second connecting unit linking together the second rod and the third rod, and having
a second abutting ring mounted through the outer surface of the second rod;
a second positioning element having two engaging stubs mounted through the third positioning holes of the second rod and the fourth positioning holes of the third rod;
a second abutting cover mounted on the second rod; and
a second covering ring mounted on an outer surface of the third rod, and having
two chambers defined in an inner surface of the second covering ring, and receiving the engaging stubs of the second positioning element.

5. The telescopic tube as claimed in claim 4, wherein
the tube assembly further has
a fourth rod mounted around the outer surface of the third rod; and
the connecting assembly further has
a third connecting unit linking together the third rod and the fourth rod, and having
a third abutting ring mounted through the outer surface of the third rod, and mounted on the fourth rod;
a third positioning element having two engaging stubs mounted through the third rod and the fourth rod;
a third abutting cover mounted on the third rod; and
a third covering ring mounted on an outer surface of the fourth rod, and having
two chambers defined in an inner surface of the third covering ring, and receiving the engaging stubs of the third positioning element.

6. The telescopic tube as claimed in claim 1, wherein
the second rod has two first abutting holes defined in the second rod and located adjacent to the second positioning holes;
the first abutting ring has
two abutting slices protruding axially from the first abutting ring; and
two encircling slices protruding axially from the first abutting ring, and located adjacent to the abutting slices;
two columns mounted through the first abutting holes and protruding radially from outer surfaces of the abutting slices respectively;
two slots defined in the abutting slices respectively;
multiple protruding parts protruding axially from the first abutting ring, and spaced apart at intervals; and
two notches defined in the encircling slices respectively, corresponding to the first positioning holes of the first rod, and receiving the engaging stubs of the first positioning element; and
the first covering ring has multiple mounting recesses defined in an inner surface of the first covering ring, spaced apart at intervals, and mounted on the protruding parts of the first abutting ring.

7. The telescopic tube as claimed in claim 6, wherein
the tube assembly further has
a third rod mounted around the outer surface of the second rod, and having
two fourth positioning holes defined in one of two ends of the third rod, wherein the second rod has two third positioning holes defined in the other end of the second rod; and
the connecting assembly further has
a second connecting unit linking together the second rod and the third rod, and having
a second abutting ring mounted through the outer surface of the second rod;

a second positioning element having two engaging stubs mounted through the third positioning holes of the second rod and the fourth positioning holes of the third rod;
a second abutting cover mounted on the second rod; and
a second covering ring mounted on an outer surface of the third rod, and having
two chambers defined in an inner surface of the second covering ring, and receiving the engaging stubs of the second positioning element.

8. The telescopic tube as claimed in claim 7, wherein the tube assembly further has
a fourth rod mounted around the outer surface of the third rod; and
the connecting assembly further has
a third connecting unit linking together the third rod and the fourth rod, and having
a third abutting ring mounted through the outer surface of the third rod, and mounted on the fourth rod;
a third positioning element having two engaging stubs mounted through the third rod and the fourth rod;
a third abutting cover mounted on the third rod; and
a third covering ring mounted on an outer surface of the fourth rod, and having
two chambers defined in an inner surface of the third covering ring, and receiving the engaging stubs of the third positioning element.

9. A walking stick comprising:
a tube assembly having
a first rod having
two first positioning holes defined in one of two ends of the first rod; and
two connecting holes defined in the other end of the first rod; and
a second rod mounted around an outer surface of the first rod and having
two second positioning holes defined in one of two ends of the second rod, wherein the second positioning holes correspond to the first positioning holes;
a connecting assembly having
a first connecting unit linking together the first rod and the second rod, and having
a first abutting ring mounted inside the second rod, and mounted around the outer surface of the first rod;
a first positioning element having
a coupling strip mounted inside the first rod and being bent and flexible;
two engaging stubs formed at both ends of the coupling strip; and
two abutting flanges formed radially on two outer surfaces of the two engaging stubs respectively, and abutting an inner surface of the first rod;
a first abutting cover having
two operating parts protruding axially from one of two end surfaces of the first abutting cover, and each operating part having an inclined surface formed on the operating part, wherein the other end surface of the first abutting cover is mounted on the first rod; and
two recesses defined in the two operating parts respectively; and a first covering ring mounted around an outer surface of the second rod and having
two insertion holes defined in an annual wall of the first covering ring, wherein the insertion holes correspond to the first positioning holes of the first rod and the second positioning holes of the second rod, and the engaging stubs mounted through the first positioning holes, the second positioning holes, and the insertion holes; and
a cap mounted on one of two ends of the tube assembly and having
two fastening holes defined in the cap and corresponding to the connecting holes; and
two fastening elements mounted through the fastening holes and the connecting holes; and
a handgrip mounted on the other end of the tube assembly.

10. The walking stick as claimed in claim 9, wherein
the first rod has two first fixing holes defined in the first rod and located adjacent to the first positioning holes;
the first abutting cover has
two first extending slices protruding axially from the other end surface of the first abutting cover, abutting the outer surface of the first rod, and having two first through holes defined in the first extending slices respectively, and corresponding to the first fixing holes;
two second extending slices protruding axially from the other end surface of the first abutting cover, located adjacent to the first extending slices, and abutting the outer surface of the first rod;
four inner extending slices protruding axially from the other end surface of the first abutting cover, abutting the inner surface of the first rod, and having two second through holes defined in the two inner extending slices respectively, and corresponding to the first through holes and the first fixing holes; and
an annular groove defined in the first abutting cover, located between the first extending slices and the second extending slices, and disposed on the first rod; and
the first connecting unit further has a first fixing element mounted through the first fixing holes, the first through holes, and the second through holes.

11. The walking stick as claimed in claim 10, wherein
the second rod has two first abutting holes defined in the second rod and located adjacent to the second positioning holes;
the first abutting ring has
two abutting slices protruding axially from the first abutting ring; and
two encircling slices protruding axially from the first abutting ring, and located adjacent to the abutting slices;
two columns mounted through the first abutting holes and protruding radially from outer surfaces of the abutting slices respectively;
two slots defined in the abutting slices respectively;
multiple protruding parts protruding axially from the first abutting ring, and spaced apart at intervals; and
two notches defined in the encircling slices respectively, corresponding to the first positioning holes of the first rod, and receiving the engaging stubs of the first positioning element; and
the first covering ring has multiple mounting recesses defined in an inner surface of the first covering ring, spaced apart at intervals, and mounted on the protruding parts of the first abutting ring.

12. The walking stick as claimed in claim 11, wherein the tube assembly further has
   a third rod mounted around the outer surface of the second rod, and having
      two fourth positioning holes defined in one of two ends of the third rod, wherein the second rod has two third positioning holes defined in the other end of the second rod; and
the connecting assembly further has
   a second connecting unit linking together the second rod and the third rod, and having
      a second abutting ring mounted through the outer surface of the second rod;
      a second positioning element having two engaging stubs mounted through the third positioning holes of the second rod and the fourth positioning holes of the third rod;
      a second abutting cover mounted on the second rod; and
      a second covering ring mounted on an outer surface of the third rod, and having
         two chambers defined in an inner surface of the second covering ring, and receiving the engaging stubs of the second positioning element.
13. The walking stick as claimed in claim 12, wherein the tube assembly further has
   a fourth rod mounted around the outer surface of the third rod; and
the connecting unit further has
   a third connecting unit linking together the third rod and the fourth rod, and having
      a third abutting ring mounted through the outer surface of the third rod, and mounted on the fourth rod;
      a third positioning element having two engaging stubs mounted through the third rod and the fourth rod;
      a third abutting cover mounted on the third rod; and
      a third covering ring mounted on an outer surface of the fourth rod, and having
         two chambers defined in an inner surface of the third covering ring, and receiving the engaging stubs of the third positioning element.
14. A clothes pole comprising:
a tube assembly having
   a first rod having two first positioning holes defined in one of two ends of the first rod; and
   a second rod mounted around an outer surface of the first rod and having
      two second positioning holes defined in one of two ends of the second rod, wherein the second positioning holes correspond to the first positioning holes;
a connecting assembly having
   a first connecting unit linking together the first rod and the second rod, and having
      a first abutting ring mounted inside the second rod, and mounted around the outer surface of the first rod;
      a first positioning element having
         a coupling strip mounted inside the first rod and being bent and flexible;
         two engaging stubs formed at both ends of the coupling strip; and
         two abutting flanges formed radially on two outer surfaces of the two engaging stubs respectively, and abutting an inner surface of the first rod;
      a first abutting cover having
         two operating parts protruding axially from one of two end surfaces of the first abutting cover, and each operating part having an inclined surface formed on the operating part, wherein the other end surface of the first abutting cover is mounted on the first rod; and
         two recesses defined in the two operating parts respectively; and
      a first covering ring mounted around an outer surface of the second rod and having
         two insertion holes defined in an annual wall of the first covering ring, wherein the insertion holes correspond to the first positioning holes of the first rod and the second positioning holes of the second rod, and the engaging stubs mounted through the first positioning holes, the second positioning holes, and the insertion holes; and
a covering assembly having
   a first end cover mounted on one of two ends of the tube assembly; and
   a second end cover mounted on the other end of the tube assembly.
15. The clothes pole as claimed in claim 14, wherein the first rod has two first fixing holes defined in the first rod and located adjacent to the first positioning holes;
the first abutting cover has
   two first extending slices protruding axially from the other end surface of the first abutting cover, abutting the outer surface of the first rod, and having two first through holes defined in the first extending slices respectively, and corresponding to the first fixing holes;
   two second extending slices protruding axially from the other end surface of the first abutting cover, located adjacent to the first extending slices, and abutting the outer surface of the first rod;
   four inner extending slices protruding axially from the other end surface of the first abutting cover, abutting the inner surface of the first rod, and having two second through holes defined in the two inner extending slices respectively, and corresponding to the first through holes and the first fixing holes; and
   an annular groove defined in the first abutting cover, located between the first extending slices and the second extending slices, and disposed on the first rod; and
the first connecting unit further has a first fixing element mounted through the first fixing holes, the first through holes, and the second through holes.
16. The clothes pole as claimed in claim 15, wherein the second rod has two first abutting holes defined in the second rod and located adjacent to the second positioning holes;
the first abutting ring has
   two abutting slices protruding axially from the first abutting ring; and
   two encircling slices protruding axially from the first abutting ring, and located adjacent to the abutting slices;
   two columns mounted through the first abutting holes and protruding radially from outer surfaces of the abutting slices respectively;
   two slots defined in the abutting slices respectively;
   multiple protruding parts protruding axially from the first abutting ring, and spaced apart at intervals; and two notches defined in the encircling slices respectively, corresponding to the first positioning holes of the first rod, and receiving the engaging stubs of the first positioning element; and the first covering ring has multiple mounting recesses defined in an inner surface of the first covering ring, spaced apart at intervals, and mounted on the protruding parts of the first abutting ring.

17. The clothes pole as claimed in claim 16, wherein the tube assembly further has
   a third rod mounted around the outer surface of the second rod, and having
      two fourth positioning holes defined in one of two ends of the third rod, wherein the second rod has two third positioning holes defined in the other end of the second rod; and
the connecting assembly further has
   a second connecting unit linking together the second rod and the third rod, and having
      a second abutting ring mounted through the outer surface of the second rod;
      a second positioning element having two engaging stubs mounted through the third positioning holes of the second rod and the fourth positioning holes of the third rod;
      a second abutting cover mounted on the second rod; and
      a second covering ring mounted on an outer surface of the third rod, and having
         two chambers defined in an inner surface of the second covering ring, and receiving the engaging stubs of the second positioning element.

18. The clothes pole as claimed in claim 17, wherein the tube assembly further has
   a fourth rod mounted around the outer surface of the third rod; and
the connecting assembly further has
   a third connecting unit linking together the third rod and the fourth rod, and having
      a third abutting ring mounted through the outer surface of the third rod, and mounted on the fourth rod;
      a third positioning element having two engaging stubs mounted through the third rod and the fourth rod;
      a third abutting cover mounted on the third rod; and
      a third covering ring mounted on an outer surface of the fourth rod, and having
         two chambers defined in an inner surface of the third covering ring, and receiving the engaging stubs of the third positioning element.

* * * * *